United States Patent Office 2,963,457
Patented Dec. 6, 1960

2,963,457

POLYMERIZATION OF ACRYLONITRILE IN AQUEOUS SOLUTION CONTAINING A PERCHLORATE SALT

Mary L. Miller, New York, N.Y., assignor to American Cyanamid Company, New York, N.Y., a corporation of Maine No Drawing. Filed Aug. 22, 1956, Ser. No. 605,488

9 Claims. (Cl. 260—29.6)

This invention relates to a method of preparing thermoplastic polymeric compositions. More particularly, the invention relates to the polymerization, an aqueous salt solutions, of acrylonitrile, and of acrylonitrile in mixtures with other monomers where the acrylonitrile constitutes at least 25% of the mixture.

Because of the insolubility of polyacrylonitrile in aqueous solutions, the potential uses of acrylonitrile polymers and copolymers have been severely limited.

In prior techniques wherein acrylonitrile has been used in aqueous mediums the polymers thereof have been initially prepared by conventional methods, for example by emulsion polymerization wherein the polymer is isolated, and then the polymers are redissolved in aqueous medium. One of the compounds which have been employed to effective solution of acrylonitrile polymer is sodium thiocyanate. However the polymerization of acrylonitrile in the presence of thiocyanate has been impractical because of the incompatability of this compound with the peroxidic catalysts ordinarily employed in the polymerization of this monomer. Furthermore, the plurality of steps required in recovery and redissolution of the polymer has been a definite disadvantage. Use of zinc chloride has also been unsatisfactory because of the tendency of this compound to decompose polymeric acrylonitrile. Methods using dimethyl formamide and ethylene carbonate as solvents have also been unsuccessful as these compounds act as chain transfer agents resulting in a polymer having a molecular weight which is too low for many applications such as film-forming and fibers.

It is the object of the present invention to provide a one-step process for polymerizing and making homogenous solutions of high molecular weight polymers containing at least 25% acrylonitrile. Other objects will become apparent from the following description and examples.

According to the invention, solutions of polymers of acrylonitrile are prepared by polymerizing acrylonitrile in an aqueous solution in the presence of alkali metal or alkaline earth metal perchlorates and a water-soluble peroxidic catalyst. Suitable solvents are aqueous salt solutions of compounds as sodium, potassium and lithium perchlorates, and calcium, barium, magnesium and strontium perchlorates. Polymerization is effective in a concentrated salt solution containing a weight ratio of about 1:1 to about 4:1 of salt per part of water.

The following examples in which the proportions are in parts by weight are given by way of illustration and not in limitation of the invention.

Example 1

Into a solution of 100 parts of sodium perchlorate dissolved in 60 parts of water is added 20 parts of acrylonitrile and catalyst comprising 0.3 part potassium persulfate dissolved in 5 parts of water followed by 0.12 part sodium metabisulfite dissolved in 5 parts of water. The mixture was reacted for 3 hours under a blanket of carbon dioxide. A film was prepared by spreading the above solution on glass and washing out the sodium perchlorate with water. The dry film was clear and tenacious. The weight average molecular weight of the polymer estimated by viscosity measurements was 100,000.

Example 2

The comparative results obtained by polymerizing acrylonitrile according to the procedure set out in Example 1 employing various salts as solubilizing agents for the polymer are set forth in the following table.

| Run | Salt | Solubility of Polymer | Color on Adding Sodium Persulfate |
|---|---|---|---|
| 1 | NaSCN | Soluble | Orange. |
| 2 | KSCN | do | Do. |
| 3 | LiSCN | do | Do. |
| 4 | NaI | Insoluble | Deep Brown. |
| 5 | KI | do | Do. |
| 6 | LiI | do | Do. |
| 7 | KBr | do | Yellow. |
| 8 | NaBr | <1% dissolves | Do. |
| 9 | NaClO$_4$ | Soluble | Colorless. |
| 10 | KClO$_4$ | do | Do. |
| 11 | LiClO$_4$ | do | Do. |
| 12 | LiCl | Insoluble | Yellow. |
| 13 | NaNO$_3$ | do | Do. |
| 14 | NH$_4$Cl | do | Do. |

From the above table it is apparent that the color and/or solubility of the polymer when using other than perchlorate salts (runs 9, 10 and 11) is unsatisfactory.

Monomers which may be copolymerized with acrylonitrile are such as acrylamide, acrylic acid, methacrylonitrile, ethyl acrylate, ethyl methacrylate, methacrylamide, and methacrylic acid. Various mixtures of these monomers may be used with acrylonitrile providing the copolymer contains at least 25% acrylonitrile. It is necessary that the solutions of these salts which serve as the polymerization medium be of high concentration, i.e. contain at least 50% of the salt.

The solutions of polymers provided by the invention may be extruded directly to form filaments, films, ribbons, or tubes. They may be used in the manufacture of paper, drilling mud additives, surface coatings and the like.

The procedure set forth in the instant invention is also useful in preparing block and graft copolymers. The preparation of graft copolymers may be accomplished either by adding acrylonitrile to the concentrated alkali metal perchlorate aqueous solution, polymerizing, and thereafter graft-polymerizing the salt-soluble or water-soluble monomers such as acrylamide. Alternately, the water-soluble or salt-soluble polymers may be dissolved in the salt solution and the acrylonitrile, or other monomer, polymerized in its presence. The following example illustrates the invention in the preparation of a graft copolymer of acrylonitrile and acrylamide.

Example 3

Into a concentrated aqueous salt solution containing 990 parts of sodium perchlorate dissolved in 560 parts of water is dissolved 11 parts of polyacrylonitrile and 33 parts of acrylamide monomer dissolved in 110 parts of water are added. 1.3 parts of sodium metabisulfite in 110 parts of H$_2$O and 6.5 parts of ammonium persulfate in 110 parts H$_2$O are then added. The mixture is polymerized at a temperature of 55° C. for a period of 5 hours. The resulting copolymer contained no ungrafted polyacrylonitrile. The absence of ungrafted polyacrylonitrile is ascertained by extracting the copolymer with dimethyl formamide with the result that none of the copolymer dissolved. The copolymer was thereafter extracted with water and it was found that some polyacrylamide dissolved. The acrylamide is recovered by dialyzing the solution and drying the dissolved polyacrylamide. The product recovered was 21.5 parts of grafted copolymer containing 62 mole percent of acrylonitrile and 38 mole percent acrylamide. Six parts of ungrafted polyacrylamide was also recovered. The residue is unpolymerized acrylamide.

Various peroxidic polymerization catalysts may be employed in addition to the potassium persulfate-sodium metabisulfite system. For example, water-soluble peroxidic catalysts alone may be employed such as sodium, potassium, or ammonium persulfates, sodium or potassium chlorates, hydrogen peroxide, urea peroxide, acetyl peroxide, succinic peroxide and the like. Such catalysts may also be suitably employed in redox catalyst systems in combination with reducing agents such as sodium or potassium bisulfite, sodium or potassium metabisulfite, ferrous sulfate, oxalic acid, glucose, lactose, and the like. Suitable redox catalyst systems are for example, potassium persulfate-sodium bisulfite, ammonium persulfate-sodium metabisulfite, hydrogen peroxide-sodium bisulfite, hydrogen peroxide-glucose, chloric acid-sodium bisulfite.

These catalysts may additionally be activated in the presence of heavy metal ions as for example iron, cobalt, manganese, chromium and the like, thereby increasing the rate of reaction and permitting the use of lesser amounts of catalyst. The metallic activators also permit lower polymerization temperatures.

In general catalysts in amounts of from about 0.005% to 5% may be utilized, preferably amounts of from about 0.1% to about 3% are employed.

In graft copolymerization reactions it is preferred to use larger amounts of catalyst in order to provide more suitable conditions and an increased number of grafts. In graft copolymerization catalysts in amounts of from about 0.1% to 8% may be used, preferably amounts of from about 1% to about 5% based on the weight of the monomers.

Various modifications and variations may be made in process of the invention without departing from the scope of the invention as defined in the appended claims.

I claim:

1. The process of preparing a solution of polymer in an aqueous medium which comprises polymerizing a monomeric polymerizable material, selected from the class consisting of acrylonitrile and mixtures containing at least 25% acrylonitrile, the remainder of the said mixture being selected from the group consisting of acrylamide, methacrylamide, acrylic acid, methacrylic acid, methacrylonitrile, ethyl acrylate and ethyl methacrylate, in an aqueous solution containing a salt selected from the group consisting of alkali metal and alkaline earth metal perchlorate salts, in a salt to water weight ratio of from 1:1 to 4:1, and a peroxidic catalyst.

2. The process of preparing a solution of polymer in an aqueous medium which comprises polymerizing a material consisting essentially of acrylonitrile in an aqueous solution containing a salt selected from the group consisting of alkali metal and alkaline earth metal perchlorate salt, in a salt to water weight ratio of from 1:1 to 4:1, and a peroxidic catalyst.

3. The process of preparing a solution of polymer in an aqueous medium which comprises polymerizing a monomeric polymerizable material, selected from the class consisting of acrylonitrile and mixtures containing at least 25% acrylonitrile, the remainder of the said mixture being selected from the group consisting of acrylamide, methacrylamide, acrylic acid, methacrylic acid, methacrylonitrile, ethyl acrylate and ethyl methacrylate, in an aqueous solution containing sodium perchlorate salt, in a salt to water weight ratio of from 1:1 to 4:1, and a peroxidic catalyst.

4. The process of preparing a solution of polymer in an aqueous medium which comprises polymerizing a material consisting essentially of acrylonitrile in an aqueous solution containing sodium perchlorate salt, in a salt to water weight ratio of from 1:1 to 4:1, and a peroxidic catalyst.

5. The process of preparing a solution of polymer in an aqueous medium which comprises polymerizing a mixture of acrylonitrile and acrylamide, wherein said acrylonitrile comprises at least 25% by weight of the monomer mixture, in an aqueous solution containing a salt selected from the group consisting of alkali metal and alkaline earth metal perchlorate salts, in a salt to water weight ratio of from 1:1 to 4:1, and a peroxidic catalyst.

6. The process of claim 5 wherein the alkali metal perchlorate salt is sodium perchlorate.

7. The process of preparing a solution of polymer in an aqueous medium which comprises polymerizing a mixture of acrylonitrile and acrylic acid wherein said acrylonitrile comprises at least 25% by weight of the monomer mixture in an aqueous solution containing a salt selected from the group consisting of alkali metal and alkaline earth metal perchlorate salt in a salt to water weight ratio of from 1:1 to 4:1 and a peroxidic catalyst.

8. The process of claim 7 wherein the alkali metal perchlorate salt is sodium perchlorate.

9. The process of preparing a grafted polymer in solution which comprises polymerizing a material consisting essentially of acrylonitrile in an aqueous solution containing a salt selected from the group consisting of alkali metal and alkaline earth metal perchlorate salts in a salt to water ratio of from 1:1 to 4:1 and a peroxidic catalyst and thereafter polymerizing on said polymerized acrylonitrile, acrylamide, methacrylamide, acrylic acid, methacrylic acid, methacrylonitrile, ethyl acrylate and ethyl methacrylate.

References Cited in the file of this patent

UNITED STATES PATENTS

| | | |
|---|---|---|
| 2,140,921 | Rein | Dec. 20, 1938 |
| 2,356,767 | Kropa | Aug. 29, 1944 |
| 2,425,192 | Kropa | Aug. 5, 1947 |
| 2,558,730 | Cresswell | July 3, 1951 |
| 2,620,324 | Coover et al. | Dec. 2, 1952 |
| 2,777,832 | Mallison | Jan. 15, 1957 |

FOREIGN PATENTS

| | | |
|---|---|---|
| 499,577 | Canada | Jan. 26, 1954 |
| 510,245 | Belgium | Apr. 15, 1952 |

UNITED STATES PATENT OFFICE

CERTIFICATION OF CORRECTION

Patent No. 2,963,457                  December 6, 1960

Mary L. Miller

It is hereby certified that error appears in the above numbered patent requiring correction and that the said Letters Patent should read as corrected below.

Column 4, lines 44 and 45, after "acrylonitrile" and before the comma insert -- in solution a monomer selected from the group consisting of acrylonitrile --.

Signed and sealed this 23rd day of May 1961.

(SEAL)
Attest:

ERNEST W. SWIDER                          DAVID L. LADD

Attesting Officer                             Commissioner of Patents